E. L. GROSS.
TANK CLOSURE.
APPLICATION FILED AUG. 30, 1911.
1,070,128.
Patented Aug. 12, 1913.
2 SHEETS—SHEET 2.
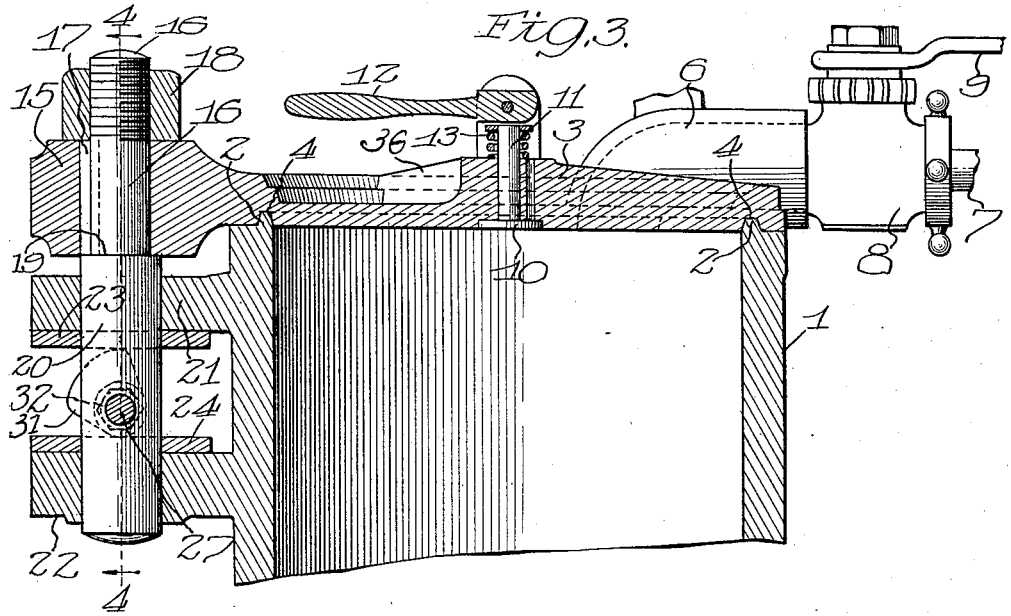
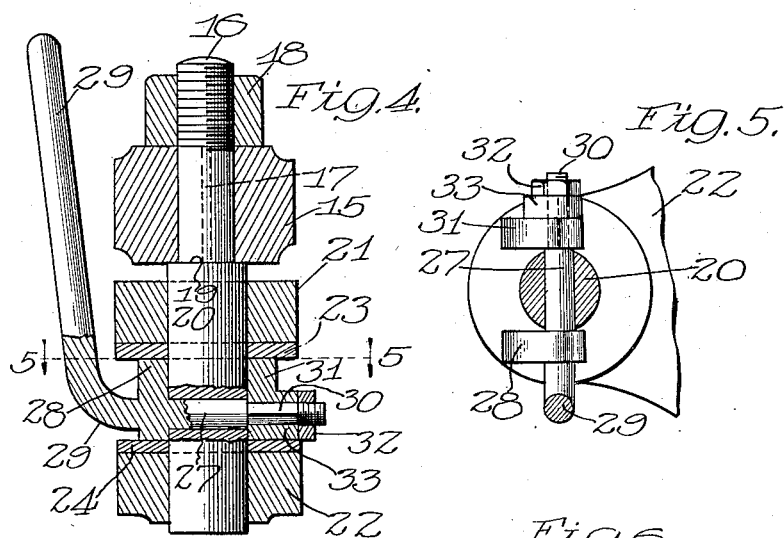
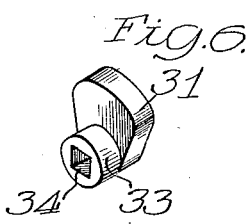
Witnesses:
Inventor:
Edward L. Gross
By
Attys.

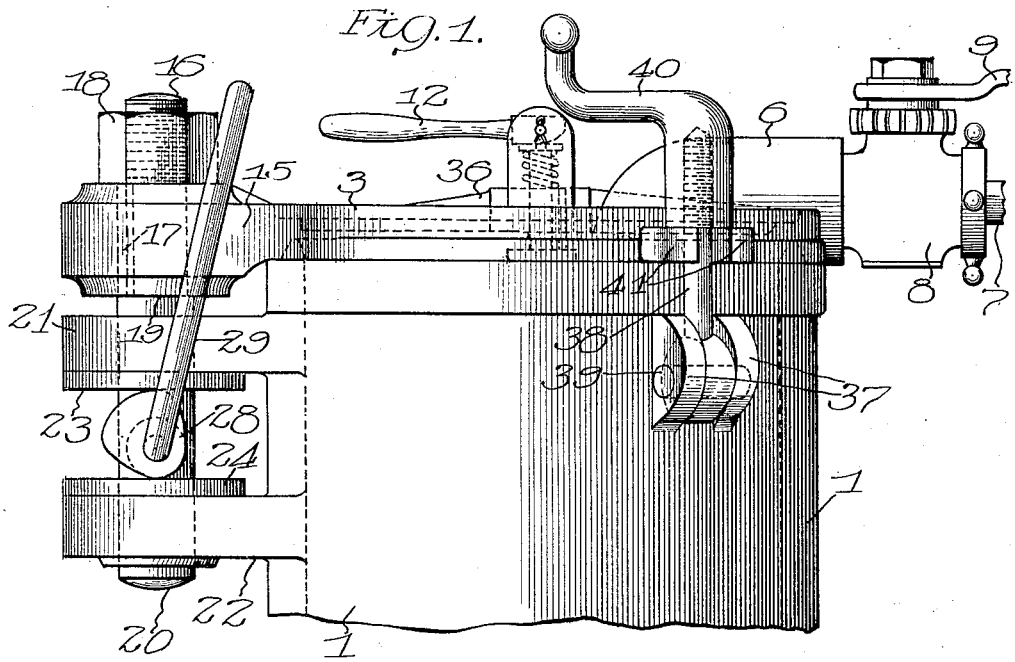

UNITED STATES PATENT OFFICE.

EDWARD L. GROSS, OF CHICAGO, ILLINOIS, ASSIGNOR TO S. OPPENHEIMER & CO., OF CHICAGO, ILLINOIS, A COPARTNERSHIP CONSISTING OF GUSTAV FREUND AND JULIUS OPPENHEIMER.

TANK-CLOSURE.

1,070,128.  Specification of Letters Patent.  Patented Aug. 12, 1913.

Application filed August 30, 1911.  Serial No. 646,849.

*To all whom it may concern:*

Be it known that I, EDWARD L. GROSS, a citizen of the United States, residing at Chicago, in the county of Cook and State of Illinois, have invented certain new and useful Improvements in Tank-Closures, of which the following is a description.

My invention belongs to that class of devices known as sausage stuffers or the like, and relates particularly to an improved closure for sausage stuffing, or similar machines, having among its objects the production of a device that is simple, convenient, efficient and satisfactory, that may be employed wherever found applicable.

To this end my invention consists in the novel construction, arrangement, and combination of parts herein shown and described, and more particularly pointed out in the claims.

In the drawings, wherein like reference characters indicate like or corresponding parts; Figure 1 is a side elevation of the upper portion of a sausage stuffer. Fig. 2 is a plan view of the top of the same. Fig. 3 is a partial sectional view taken substantially on line 3—3 of Fig. 2. Fig. 4 is a sectional view taken substantially on line 4—4 of Fig. 3. Fig. 5 is a sectional view taken substantially on line 5—5 of Fig. 4; and Fig. 6 is a perspective view of the cam member 31.

Referring to the drawings, in which one end of the stuffer is shown, 1 represents the body or casing of the stuffer, the opposite end of the casing and plunger or piston not being illustrated. The open end of the casing is provided with a removable closure or cover 3, the parts being preferably provided with a coöperating bead and recess for affording a tight fit. As shown, a bead or raised part 2 is provided on the end of the casing, while the cover 3 is provided with a groove 4 arranged to receive the bead when the closure is positioned. Suitably arranged at the end of the receptacle or stuffer, as shown in the top or closure, are any desired number of discharge pipes or outlets, two being shown for the purpose of illustration.

Referring particularly to Figs. 1 and 2, the closure 3 is provided with one or more tubular extended parts 6, to which is connected the outlet or discharge pipes 7, a valve arranged in the casing 8 and operated by a handle 9 being preferably provided for each outlet. The stuffer is also provided with an air vent, which is shown in the closure and controlled by a valve 10 (see Fig. 3) having a stem 11, which may be operated by a handle 12. Any suitable means may be employed for normally maintaining the valve 10 closed, a spring 13 being shown for the purpose.

The closure shown is pivotally secured to the receptacle and arranged to be swung transversely of the receptacle in opening or closing. Owing to the bead 2 in the groove 4, however, it is necessary to slightly raise or move the closure longitudinally of the casing 1 before swinging or to lower the same after it is returned over the top of the receptacle. To pivotally secure the closure to the receptacle, I extend the same as at 15. The end 15 is secured to a longitudinally movable and rotatable shaft 20 extended as at 16, the closure being locked on the shaft by a key 17 or its equivalent. A nut 18 and the shoulder 19 prevents longitudinal movement of the shaft relative to the extended end 15. The shaft 20 is supported by and rotatable in extensions or brackets 21 and 22 upon the casing. On the lower side of the extended part 21 and upon the upper side of 22 are bearing plates 23 and 24, which may be secured in position in any desired way. Extending through the shaft part 20 between the extensions 21 and 22 is a pin 27, which is provided with a cam 28, and also preferably further extended to form a handle 29. The opposite end of the pin 27 is provided with a cam 31, the pin being squared as at 30, and the cam secured on the squared end by a nut 32 or its equivalent. The shaft and cam members are arranged to lock one side of the cover in position as will be more fully described hereafter. To lock the opposite side of the closure at any desired point, I provide pins or bolts 38, which are pivotally secured to the casing by pins 39, which pass through extended parts 37 on the casing, and an eye in the lower end of each bolt. On the closure are extended parts or lugs 41 between which the bolts 38 are passed. Upon the ends of the bolts are provided nuts 40 which may be extended to form handles, so that the nuts may be conveniently operated. It is not necessary to describe the operation of the complete stuffer other than saying that within the receptacle is arranged a piston (not shown) upon which or between which and the closure the sausage or other material is placed. The contents of the stuffer is forced out through the outlets, and the pipes 7, into the sausage casing (not shown) by raising the piston with compressed air or in an equivalent manner. When it is desired to remove the closure for the purpose of recharging the stuffer or for cleaning the same, the nuts are rotated and the bolts 38 dropped. When the handle is in the position shown in Fig. 1, the cams 28 and 31 are engaging the plates 23 and 24, locking that side of the cover in position. As the handle is turned down, the cams engaging the lower plate 24 raise the shaft 20 and its extended part 16 thereby raising the closure so that it is above the bead 2. The handle 29 is then operated so as to rotate the shaft 20 swinging the closure transversely of the receptacle. The closure may be positioned and locked by reversing the operations described. By swinging the closure as described, which may be of considerable weight, there is no strain upon the same as in the case where the closure is hinged and less opportunity for breaking by carelessness in handling.

Having thus described my invention, it is obvious that various immaterial modifications may be made in the same without departing from the spirit and scope of my invention as defined in the appended claims, hence I do not wish to be understood as limiting myself to the exact construction, arrangement, combination of parts or uses mentioned.

What I claim as new, and desire to secure by Letters Patent is:—

In a device of the character described, a receptacle, provided with a pair of spaced ears projecting laterally therefrom, a shaft rotatably supported in said laterally projecting ears, a closure for said receptacle carried by said shaft, and a cam pivotally mounted upon said shaft and positioned between the ears projecting from said receptacle, said cam being adapted to coöperate with said ears to move the shaft longitudinally when the cam is shifted on its pivot.

In testimony whereof I have hereunto signed my name in the presence of two subscribing witnesses.

EDWARD L. GROSS.

Witnesses:
 Roy W. Hill,
 Charles I. Cobb.

---

Copies of this patent may be obtained for five cents each, by addressing the "Commissioner of Patents, Washington, D. C."